United States Patent [19]

Towers et al.

[11] Patent Number: 5,647,702
[45] Date of Patent: Jul. 15, 1997

[54] APPARATUS FOR DRILLING VARIABLE SIZE HOLES IN BOWLING BALL

[75] Inventors: Bill Eugene Towers, Belmont, Mich.; Ladislav Jurik, Brookfield; Richard Larry Weinbrenner, Lemont, both of Ill.

[73] Assignee: Brunswick Bowling & Billiards Corporation, Lake Forest, Ill.

[21] Appl. No.: 380,077

[22] Filed: Jan. 30, 1995

Related U.S. Application Data

[63] Continuation-in-part of Ser. No. 336,143, Nov. 14, 1994.

[51] Int. Cl.⁶ ............................................ B23B 41/00
[52] U.S. Cl. ........................ 408/150; 408/13; 408/173; 408/DIG. 1
[58] Field of Search ............................ 408/149, 150, 408/173, 178, 13, 18, DIG. 1

[56] References Cited

U.S. PATENT DOCUMENTS

| | | |
|---|---|---|
| 2,393,026 | 1/1946 | Dietz et al. . |
| 2,393,908 | 1/1946 | Hubbard . |
| 2,460,385 | 2/1949 | Hausman . |
| 2,475,876 | 7/1949 | Campi . |
| 2,844,375 | 7/1958 | Nestor . |
| 2,879,679 | 3/1959 | Neff . |
| 2,936,177 | 5/1960 | Dietz . |
| 3,001,793 | 9/1961 | Insetta . |
| 3,012,783 | 12/1961 | Bunk et al. . |
| 3,095,767 | 7/1963 | Jesonis . |
| 3,102,725 | 9/1963 | Jarus . |
| 3,129,002 | 4/1964 | Bednash . |
| 3,143,901 | 8/1964 | Bawtinheimer . |
| 3,197,206 | 7/1965 | Yettito . |
| 3,382,740 | 5/1968 | Lotta . |
| 3,465,619 | 9/1969 | Blaker et al. . |
| 3,640,633 | 2/1972 | Gersch et al. .......................... 408/150 |
| 3,685,917 | 8/1972 | Patt ........................................ 408/150 |
| 3,740,160 | 6/1973 | Kimura et al. ........................ 408/13 |
| 3,804,412 | 4/1974 | Chetirko . |
| 3,884,590 | 5/1975 | Skrentner et al. ................... 408/13 |
| 4,289,312 | 9/1981 | Heimbigner . |
| 4,358,112 | 11/1982 | Straborny . |
| 4,381,863 | 5/1983 | Norman . |
| 4,432,546 | 2/1984 | Allen, Jr. . |
| 4,552,493 | 11/1985 | Schultshick ........................... 408/13 |
| 4,632,396 | 12/1986 | Taylor . |
| 4,773,645 | 9/1988 | Todd et al. . |
| 4,892,308 | 1/1990 | Gaunt . |
| 4,968,033 | 11/1990 | Aluotto . |
| 5,002,276 | 3/1991 | Bernhardt . |
| 5,118,106 | 6/1992 | Goldman . |
| 5,173,016 | 12/1992 | Ellison et al. ........................ 408/1 R |

*Primary Examiner*—Daniel W. Howell
*Attorney, Agent, or Firm*—Wood, Phillips, VanSanten, Clark & Mortimer

[57] ABSTRACT

A bowling ball drilling apparatus for drilling variable size holes includes a table having an upwardly opening ball supporting pocket. A boring apparatus is mounted below the table for reciprocation in a generally vertical direction in a path intersecting the pocket. A carriage moves the boring apparatus in the path. The boring apparatus has an output shaft rotatable about a vertical axis. An adjustable boring head is connected to the output shaft for rotation therewith, the boring head receiving a boring tool and being variable adjusted to offset the boring tool horizontally relative to the vertical axis so that the boring tool orbits about the vertical axis to produce a variable size hole in the bowling ball dependent on an amount of the offset.

19 Claims, 11 Drawing Sheets

APPARATUS FOR DRILLING VARIABLE SIZE HOLES IN BOWLING BALL

CROSS-REFERENCE

This application is a continuation-in-part of application Ser. No. 08/336,143, filed Nov. 14, 1994.

FIELD OF THE INVENTION

This invention relates to bowling games and, more particularly, to bowling balls used in such games. Specifically, the invention relates to fitting a ball to a bowler and drilling finger holes in the ball after it has been fitted to the precise size selected by the bowler.

BACKGROUND OF THE INVENTION

As is well known, a bowler purchases a new bowling ball in a form that is free from finger holes. In the usual case, the ball is sold with an index mark which is generally intended to be located centrally of the finger holes. Holes are drilled about the index mark, typically for receipt of the middle finger and the ring finger on one side of the index mark and a hole for the thumb on the opposite side thereof.

The holes may be bored to various diameters to fit the finger size of the bowler. Typically, thumb hole and finger hole diameters will range from ⅝ of an inch to 1³⁄₃₂ of an inch.

Generally, bowling balls are purchased at stores that specialize in bowling goods and/or bowling "pro" shops where there is sufficient traffic in bowling ball sales to justify the presence of a ball drilling machine as well as an experienced operator for the drilling machine. Also, it is necessary that there be a person in attendance who is knowledgeable in fitting a ball to a bowler so that the proper hole diameters, span, pitch and bridge are determined to set the parameters for the drilling operation.

It is believed that the foregoing situation has deterred many bowlers from buying their own balls, the bowlers relying instead on so-called "house" balls maintained in most bowling establishments for use by patrons who do not own their own balls. For example, frequenting such a store specializing in bowling goods to make the purchase of a bowling ball is a less likely occurrence than a person frequenting a mass merchandiser, discount warehouse or the like. Consequently, the purchase of a bowling ball by many is put off, or does not occur at all because of this factor.

The problem may be compounded because many such establishments are relatively small and do not have the personnel available to fit the ball and then drill it during a single visit by the patron. Frequently, the ball will be fitted during regular store hours, but will not be drilled until after store hours, necessitating a return trip by the purchaser to pick up the drilled ball.

Further, in conventional drilling of bowling balls the individual holes are drilled with a drill bit of a select size corresponding to the diameter of the opening. Such a requirement is easily satisfied in the above-described custom drilling operation where the bit size can readily be changed by an operator. Alternatively, ball drilling apparatus has been proposed in which a uniform size hole, of a relatively large diameter, is pre-drilled. If a smaller diameter hole is required, then an insert is used to provide the necessary hole size.

Thus, there is a real need for an inexpensive, simple and sure means for fitting a ball to a bowler and drilling the same to include a hole size necessary for a particular bowler.

SUMMARY OF THE INVENTION

In accordance with the invention there is provided an apparatus for drilling holes of a select variable size in a bowling ball.

Broadly, there is disclosed herein such an apparatus including a table having a ball supporting pocket. A boring apparatus is mounted below the table for reciprocation in a path intersecting the pocket. Means are provided for moving the boring apparatus in the path. The boring apparatus has an output shaft rotatable about a fixed axis. An adjustable boring head is connected to the output shaft for rotation therewith, the boring head receiving a boring tool and being variable adjusted to offset the boring tool relative to the fixed axis so that the boring tool orbits about the fixed axis to produce a variable size hole in the bowling ball dependent on an amount of the offset.

The boring head comprises a base fixedly connected to the shaft and including a slot generally perpendicular to the fixed axis and a drill chuck having a tail slidably received in the slot to produce the offset. More particularly, the slot comprises a dovetail slot and the tail comprises a dovetail tenon received in the dovetail slot.

In accordance with one embodiment of the invention, means are provided for automatically adjusting the offset as part of a drilling operation and for selectively controlling the amount of the offset.

In a disclosed embodiment, the output shaft comprises a hollow shaft receiving an adjustment rod, the adjustment rod including an offset cam operatively engaging the drill chuck whereby rotation of the output adjustment shaft relative to the output shaft slidably moves the chuck relative to the base to produce the offset. A clutch locks the adjustment rod and the output shaft together. An adjustment mechanism selectively disengages the clutch and rotates the adjustment rod relative to the output shaft. Particularly, the adjustment mechanism includes an adjustment motor having a motor shaft. Movement of the boring apparatus proximate the adjustment motor causes the adjustment motor to engage the clutch to disengage the clutch so that rotation of the motor shaft rotates the adjustment rod relative to the output shaft. A mechanical catch prevents rotation of the output shaft incident to operation of the adjustment motor.

In accordance with another aspect of the invention, the apparatus includes means for selecting a desired hole diameter and a boring head control operable to drill the desired hole size and operable to initially position the boring head to produce a zero offset to drill a pilot hole and subsequently position the boring head to produce a select offset required to drill a hole of the desired hole diameter.

Further features and advantages of the invention will be readily apparent from the specification and the drawing.

DETAILED DESCRIPTION OF THE INVENTION

Figure 1:
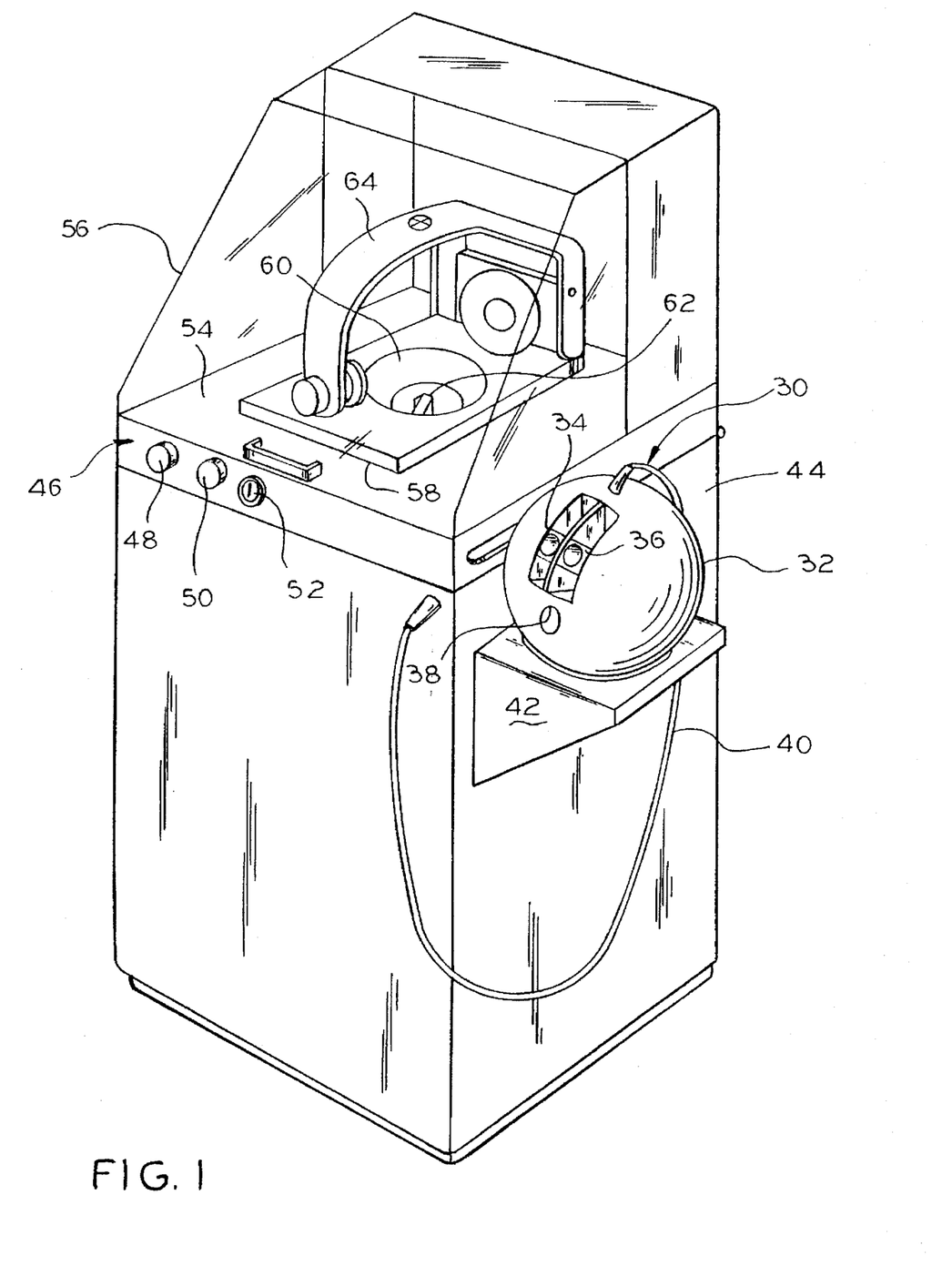
FIG. 1 is a perspective view of an apparatus for fitting a bowling ball to the hand of a user and an apparatus for drilling a bowling ball combined with one another according to the invention.

Referring to FIG. 1, a combined fitting and drilling apparatus according to the invention is illustrated. However, it is to be particularly noted that the drilling apparatus is usable without specific fitting apparatus and vice versa. It is, nonetheless, a preferred embodiment of the invention that the two be combined together as to be described herein.

The fitting apparatus is generally designated 30 and includes a frame 32 in the size, shape and approximate weight of a typical bowling ball. The fitting apparatus 30 includes a first movable finger block 34 and a second movable finger block 36 in side-by-side relation. Also included is a stationary, thumb aperture 38. The finger blocks 34 and 36 are movable toward and away from the thumb hole 38 independently of one another, and may be latched in any desired position within their ranges of movement. Through the use of inserts received in bores in the finger blocks 34 and 36, as well as the thumb hole 38, electrical signals representing information to be used in drilling a ball are generated and may be output on a flexible, electrical cable 40.

As illustrated, the fitting apparatus 30 rests under the influence of gravity on a shelf 42 which is on the side of a cabinet 44 housing the drilling apparatus generally designated 46. By reason of the use of the flexible cord 40, and because of the shaping and weighting of the fitting apparatus 30 as a bowling ball, a person may set the finger blocks 34 and 36 in a desired position of adjustment and then "phantom" throw the ball to determine the "feel" of the particular adjustment and hole size selected. Naturally, of course, the person will not release the apparatus but merely swing the same, thus, a "phantom" throw. If, upon the conclusion of one or more phantom throws, the position of the finger blocks 34 and 36 relative to the thumb hole 38 is suited to the bowler's desires, and the hole size of the selected inserts is satisfactory, a drilling operation may be commenced by depressing a "start" button 48 using information provided from the fitting apparatus 30 via the electrical cable 40. The drilling operation then continues until completed. An emergency "stop" button 50 may be used to stop the drilling operation. Likewise, a key lock switch 52 is provided to enable or disable the drilling apparatus 46.

The drilling apparatus 46 includes a table 54 on the upper side of the cabinet 44. A transparent hood 56 may be pivoted on the cabinet 44 in any suitable fashion between open and closed positions. A carriage 58 is mounted on the table 54 for movement thereon in two mutually perpendicular directions. The carriage 58 includes an upwardly opening, ball receiving pocket 60. The lower part of the pocket 60 is open. A boring tool in the form of a drill bit 62 mounted below the table 44 moves in a generally vertical direction in a path intersecting the pocket 60 to engage a bowling ball gripped by a gripping apparatus 64.

A more detailed discussion of the fitting apparatus 30 and drilling apparatus 46 is included in our pending parent application Ser. No. 08/336,143, filed Nov. 14, 1994, entitled "Apparatus for Fitting and Drilling Bowling Balls", the specification of which is hereby incorporated by reference herein. The present continuation-in-part application is particularly directed to a modification in the fitting apparatus shown in the pending application to include electronically encoded finger inserts to communicate to the drilling apparatus the hole size associated with the insert and to modify the drilling apparatus to include an adjustable drilling head so that the apparatus can drill holes of a select variable size using a fixed size drill bit. The details of the fitting apparatus and drilling apparatus relevant to the modifications are specifically discussed herein.

Figure 2:
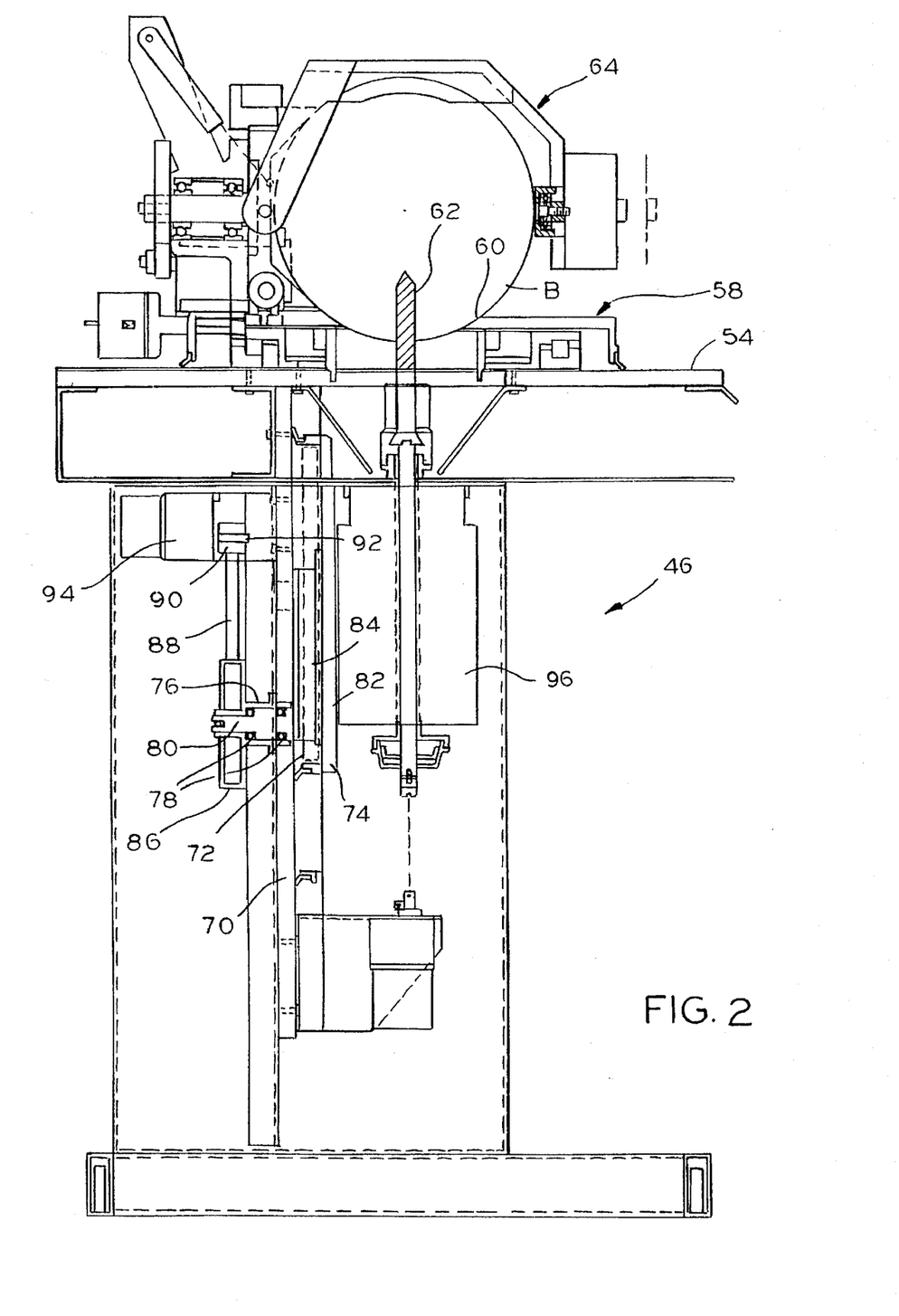
FIG. 2 is an elevation view of the ball drilling apparatus with an outer housing removed and with parts shown in section.

Referring now to FIG. 2, the ball drilling apparatus 46 is shown in greater detail. As shown, the gripping apparatus 64 maintains a bowling ball B in a proper orientation relative to the drill bit 62. The particular structure of the gripping apparatus 64 is described in our pending application incorporated by reference herein. The purpose of the gripping apparatus 64 is to allow the ball B to be properly aligned with the drilling apparatus 46 prior to the initiation of a drilling operation.

Mounted to the underside of the table 54 is a vertically directed, depending plate 70. The plate 70 mounts a pair of linear bearings 72, one of which is shown, which in turn mount a carriage 74 for vertical movement below the table 54. The plate 70 also mounts a sleeve 76. The sleeve mounts bearings 78 which journal a shaft 80. One end of the shaft 80 mounts a pinion gear 82 which is engaged with a rack 84 which is mounted to the carriage 74. As a consequence, when the shaft 80 is rotated such rotation is converted to linear motion by the rack 84 and pinion gear 82 and reciprocates the carriage 74 in a vertical direction depending upon the direction of rotation applied to the shaft 80.

Rotation of the shaft 80 is accomplished via a toothed wheel 86 having a toothed timing belt 88 wreathed about it as well as a toothed wheel 90 on the output shaft 92 of a stepping motor 94 also mounted on the plate 70. Alternatively, the motor 94 could be a servo motor. The stepping motor 94 is operated to advance the carriage 74 toward or away from the table 54.

Figure 3:
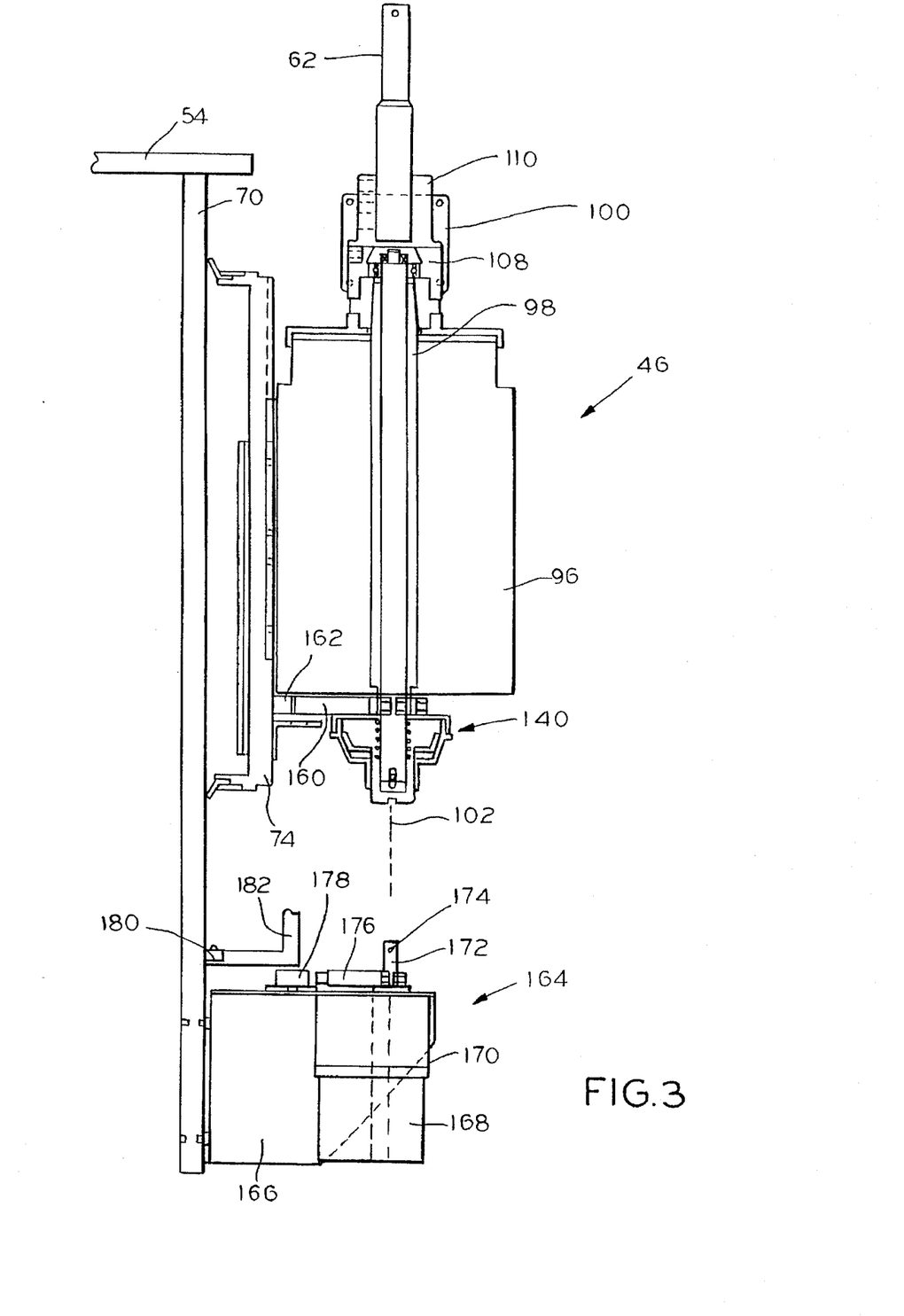
FIG. 3 is a view similar to that of FIG. 2 with parts removed for clarity.

Referring now to FIG. 3, the drilling apparatus 46 is illustrated in even greater detail with the components for moving the carriage 74 omitted for clarity. On the side of the carriage 74 opposite from the plate 70, the carriage 74 mounts a direct current drill spindle motor 96. The motor 96 has an output shaft 98 connected to an adjustable boring head 100 which mounts the drill bit 62. Energization of the motor 96 causes rotation of the output shaft 98 about a vertical axis, represented by a dashed line 102, to cause rotation of the drill bit 62. Boring of a ball B, see FIG. 2, is then accomplished by driving the carriage 74 upwardly through operation of the stepper motor 94.

Figure 4:
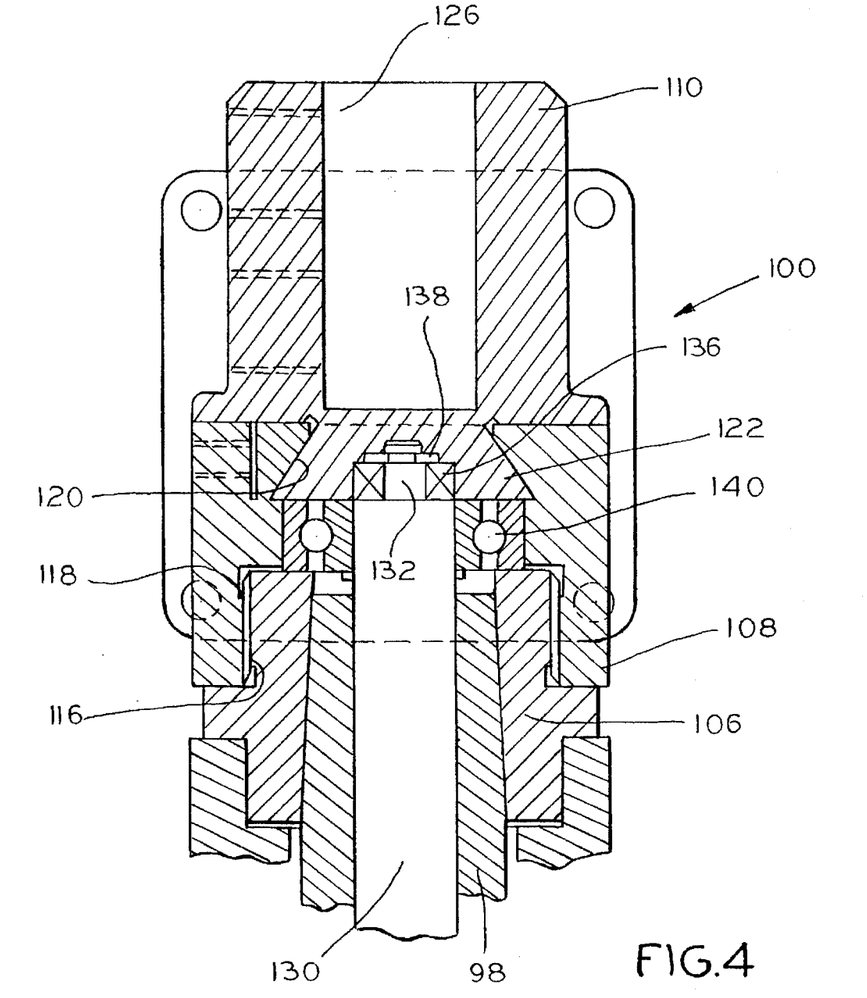
FIG. 4 is a partial elevation view showing details in section of a boring head of the drilling apparatus connecting an output shaft to a drilling bit.

In accordance with the invention, the boring head 100 is variably adjusted to offset the drill bit 62 horizontally relative to the vertical axis 102 so that the drill bit 62 orbits about the vertical axis to produce a variable size hole in the bowling ball dependent on an amount of the offset. Referring also to FIG. 4, the boring head 100 is illustrated in greater detail. The boring head 100 includes a hub 106, base 108 and chuck 110.

Figure 5:
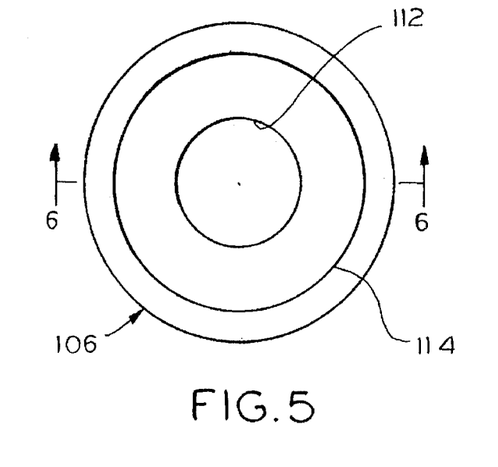
FIG. 5 is a plan view of a hub of the boring head of FIG. 4.
Figure 6:
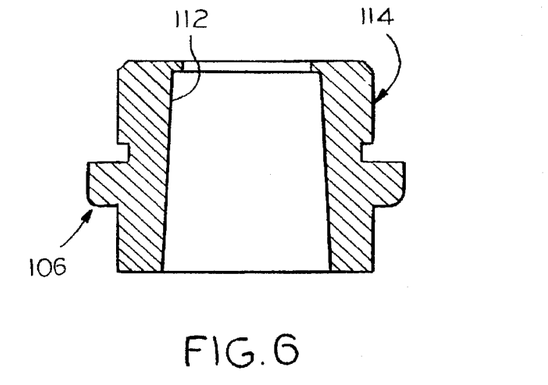
FIG. 6 is a sectional view taken along the line 6—6 of FIG. 5.

Referring also to FIGS. 5 and 6, the hub 106 is generally cylindrical and includes a through bore 112 having sloped walls to define a Morse taper for receiving a similarly tapered upper end of the motor output shaft 98, see FIG. 4, using a force fit. As such, the hub 106 is connected to the output shaft 98 for rotation therewith. An upper end of the outer wall of the hub 106 is threaded as at 114.

Figure 7:
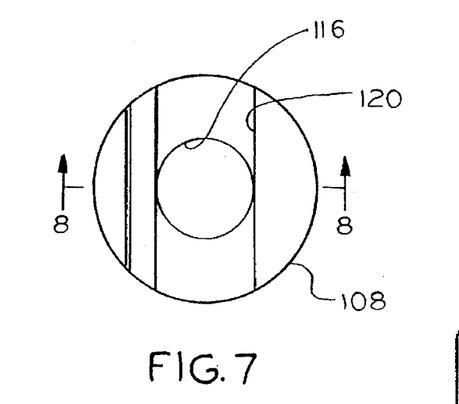
FIG. 7 is a plan view of a dovetail base of the boring head of FIG. 4.
Figure 8:
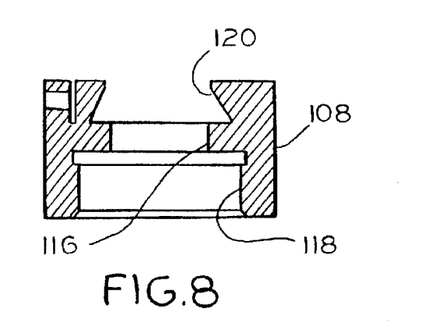
FIG. 8 is a sectional view taken along the line 8—8 of FIG. 7.

Referring also to FIGS. 7 and 8, the base 108 is also generally cylindrical and includes a through bore 116. A threaded counterbore 118 is provided at an inner end of the base 108 for threadably receiving the hub threaded upper end 114, as is particularly illustrated in FIG. 4. A dovetail slot 120 extends across the top of the base 108 and is in communication with the bore 116, as shown.

Figure 9:
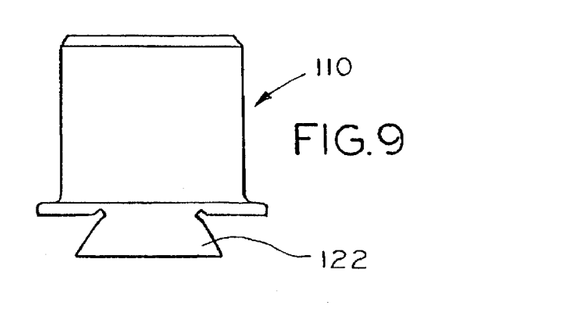
FIG. 9 is an elevation view of a chuck for the boring head of FIG. 4.
Figure 10:
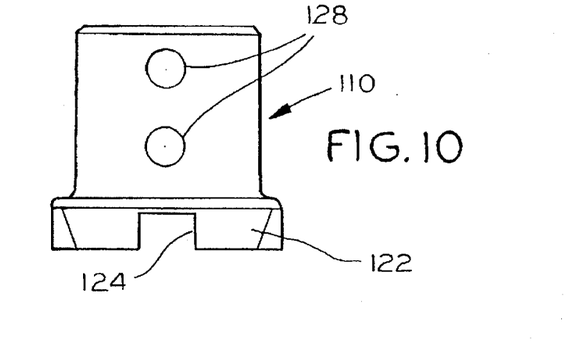
FIG. 10 is a second side view of the chuck of FIG. 9.
Figure 11:
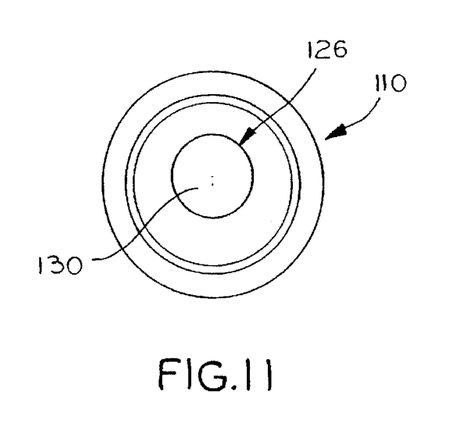
FIG. 11 is a plan view of the chuck of FIG. 9.

Referring also to FIGS. 9–11, the chuck 110 is illustrated in greater detail. The chuck 110 is generally cylindrical and has a dovetail tenon or slide 122 extending across its lower wall. A central rectangular slot 124 extends generally through the dovetail tenon 122 perpendicular therewith, as is particularly illustrated in FIG. 10. Opposite the dovetail tenon 122, the chuck 110 includes a counterbore 126 at its upper end for receiving the drill bit 62. Threaded openings 128 communicate with the counterbore 126 for receiving threaded fasteners for securing the drill bit 62 in the chuck bore 126. As is particularly illustrated in FIG. 11, the counterbore 126 is offset from a center point 130 of the cylindrical chuck 110, for reasons described particularly below.

Returning again to FIG. 4, the dovetail tenon 122 of the chuck 110 is slidably received in the dovetail slot 120 of the base 108. Owing to this relationship, rotation of the output shaft 98 similarly causes rotation of the chuck 110 via the hub 106 and base 108. However, the horizontal position of the chuck 110 relative to the base 108 can be varied due to the slidable movement of the dovetail tenon 122 in the dovetail slot 120 to produce an offset which adjusts a drill bit horizontally relative to the vertical axis 102 of the motor output shaft 98 so that the drill bit orbits about the vertical axis 102 to produce a variable size hole dependent on the amount of the offset.

Figure 4A:
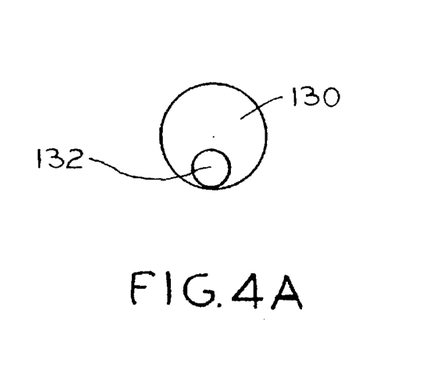
FIG. 4a is a plan view of a top end of an adjustment rod engaging the boring head of FIG. 4.

To selectively control the amount of the offset, an adjustment rod 130 extends longitudinally through the hollow motor output shaft 98. Extending upwardly from atop the adjustment rod 130 is a cam 132. The cam 132 is offset from center as is particularly illustrated in FIG. 4A. A bearing 136 surrounds the cam 132 and is secured thereon via a retainer 138. A further bearing 140 surrounds the adjustment rod 130 within the base 108 to facilitate relative rotation therebetween, when required.

Figure 12:
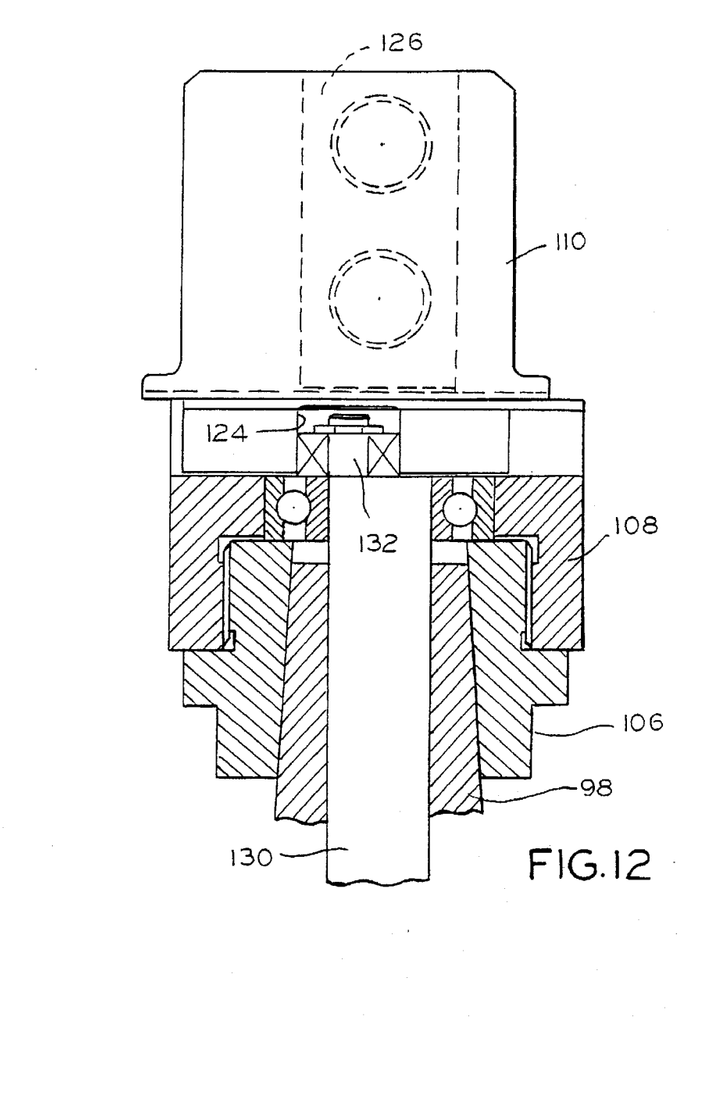
FIG. 12 is a front view of the boring head of FIG. 4 showing the boring head configured to produce zero offset.
Figure 13:
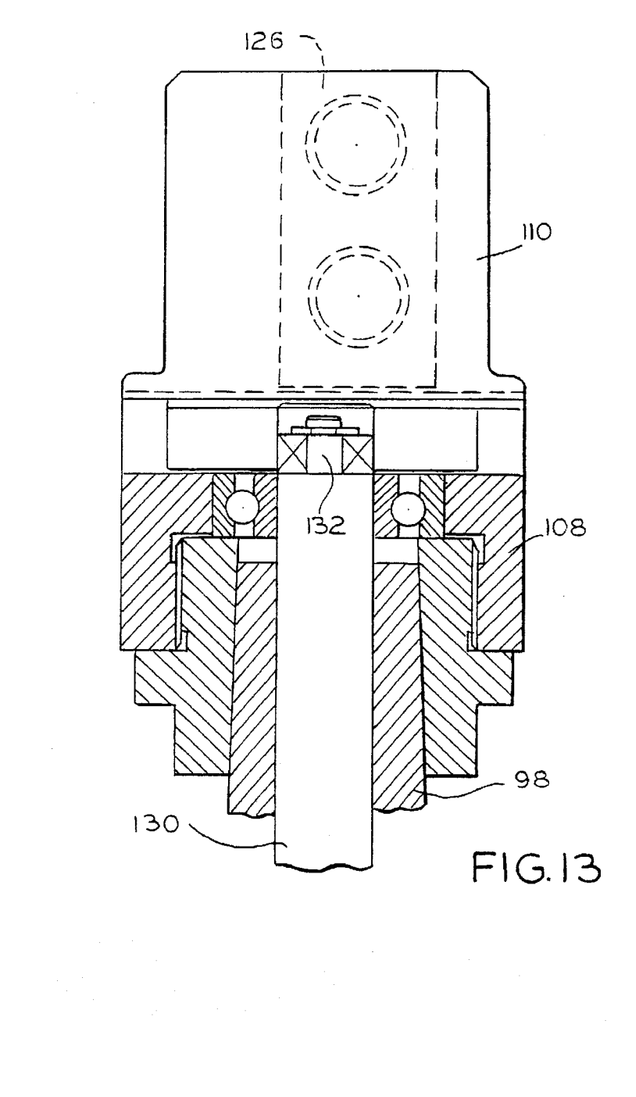
FIG. 13 is a front elevation view of the boring head of FIG. 4 with the boring head selected to produce a select non-zero offset.

As is particularly illustrated in FIG. 12, the adjustment rod 130 extends upwardly through the base 108 so that the cam 132 is received in the dovetail slide slot 124. As will be appreciated, rotation of the adjustment rod 130 relative to the output shaft 98 is converted to linear movement of the dovetail tenon 122 within the dovetail slot 120. This is particularly illustrated by comparing FIG. 12 to FIG. 13. FIG. 12 illustrates the cam 132 in a rotational position such that the chuck 110 is in the left-most position, as shown, relative to the base 108, while FIG. 13 illustrates the adjustment rod 130 rotated 90° so that the drill chuck 110 is in a general central position, as shown, relative to the base 108. As discussed above, the chuck counterbore 126 is offset from center, as is apparent also in FIGS. 12 and 13. As a result of this offset, the counterbore 126 is coaxial with the output shaft 98 when the cam 132 is in the position shown in FIG. 12. This produces a zero offset of the drill bit relative to the vertical axis 102 so that the drill bit will drill a hole of a diameter corresponding to the diameter of the drill bit. Conversely, FIG. 13 shows that the 90° movement of the adjustment rod 130 and thus cam 132 produces a linear, horizontal offset of the counterbore 126 relative to the output shaft 98. As a result, the drill bit orbits about the vertical axis 102 to produce a variable size hole in the bowling ball dependent on an amount of the offset.

As will be appreciated, the maximum offset will result when the adjustment rod 130 is rotated 180° from the position shown in FIG. 12. In one embodiment of the invention, in which a 5/8 inch drill bit is used, the drill bit can be offset in the manner shown to provide a maximum diameter opening of 1¼ inch. As is apparent, the particular opening sizes depend on the size of the drill bit used as well as the relative sizes of the boring head components.

During a drilling operation the chuck 110 must be locked in a particular position relative to the base 108. This is accomplished using an adjustment clutch 140 mounted to an underside of the motor 96. The adjustment clutch 140 is illustrated in greater detail in FIG. 14.

Figure 14:
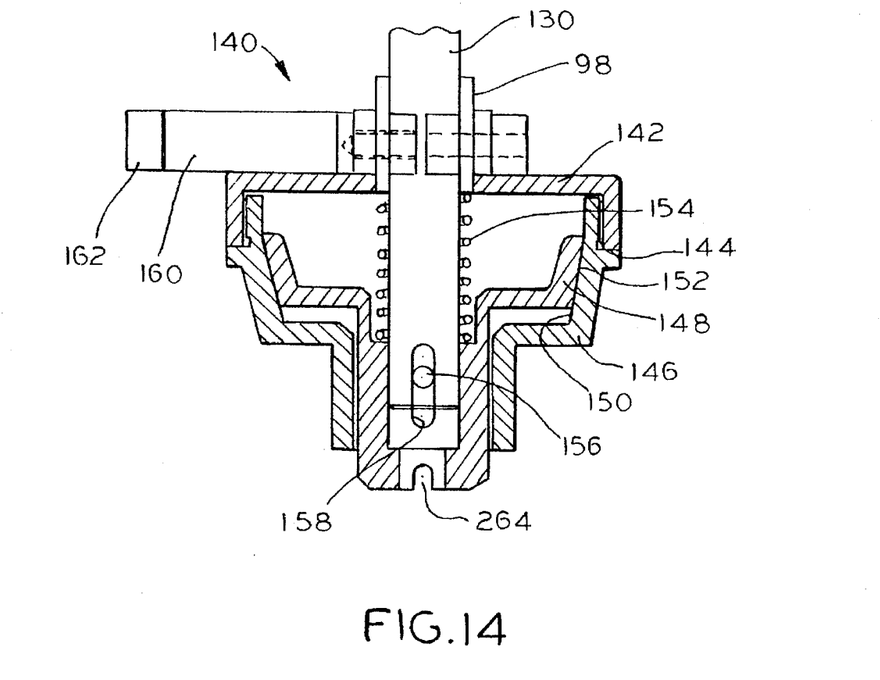
FIG. 14 is a sectional view of an adjustment clutch for the drilling apparatus of FIG. 2.

The clutch 140 includes a downwardly opening cup 142 secured to the motor output shaft 98 for rotation therewith. The cup 142 includes a threaded inner wall 144 receiving a threaded outer wall of an outer clutch member 146. The outer clutch member receives an inner clutch member 148. Particularly, the outer clutch member 146 includes a tapered inner wall 150 receiving a corresponding, complementary tapered outer wall 152 of the inner clutch member 148. A clutch spring 154 surrounds the adjustment rod 130 and extends between the cup 142 and the inner clutch member 148 so that the inner clutch member tapered outer surface 152 frictionally engages the outer clutch member inner tapered surface 150, as shown. Consequently, the inner clutch member 148 is rotational with the outer clutch member 146. An inner clutch pin 156 extends through an engagement slot 158 in the adjustment rod 130. Consequently, the adjustment rod 130 is directly rotational with the inner clutch member 148. The slot 158 allows for relative axial movement between the inner clutch member 148 and the adjustment rod 130 for disengaging the clutch, as discussed below.

A spindle motor shaft alignment lever 160 is connected to the hollow motor shaft 98 and in a particular rotational position is proximate a spindle shaft index proximity sensor 162. As particularly shown in FIG. 3, the proximity sensor 162 is affixed to the carriage 74.

Figure 15:
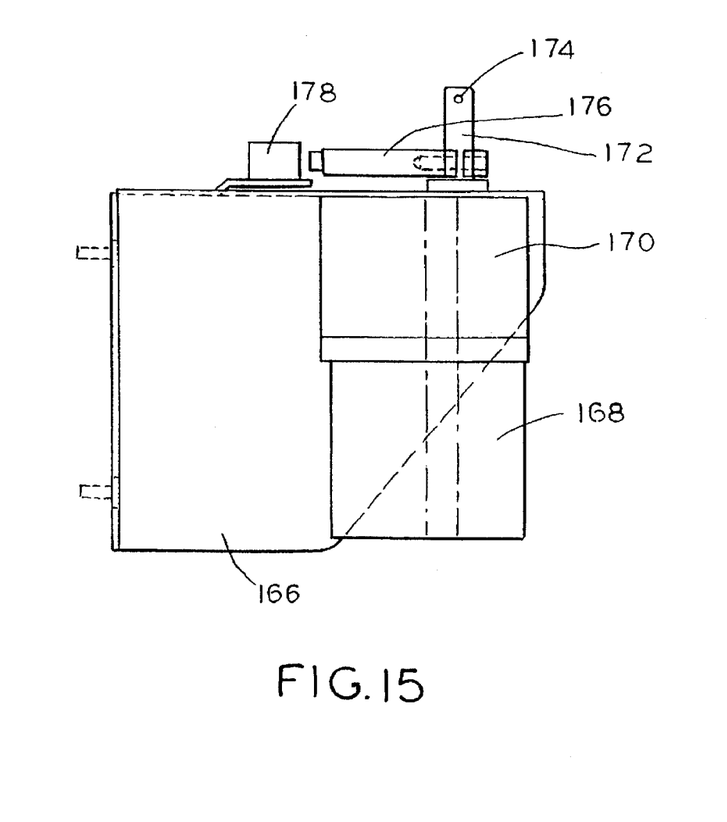
FIG. 15 is an elevation view of an adjustment motor assembly for the drilling apparatus of FIG. 2.

Referring again to FIG. 3 and also FIG. 15, a diameter adjustment mechanism 164 is provided for automatically adjusting the offset of the chuck 110 relative to the base 108. The adjustment mechanism 164 includes a bracket 166 mounted to the plate 70. The bracket 166 supports a diameter adjustment stepping motor or servo motor 68 connected via gear head 170 to a motor shaft 172. An engagement pin 174 extends through an upper end of the motor shaft 172. A motor shaft position indicator lever 176 is connected to the motor shaft 172 for rotation therewith and in a reference position engages an actuator of a roller switch 178 connected to the bracket 166.

Figure 16:
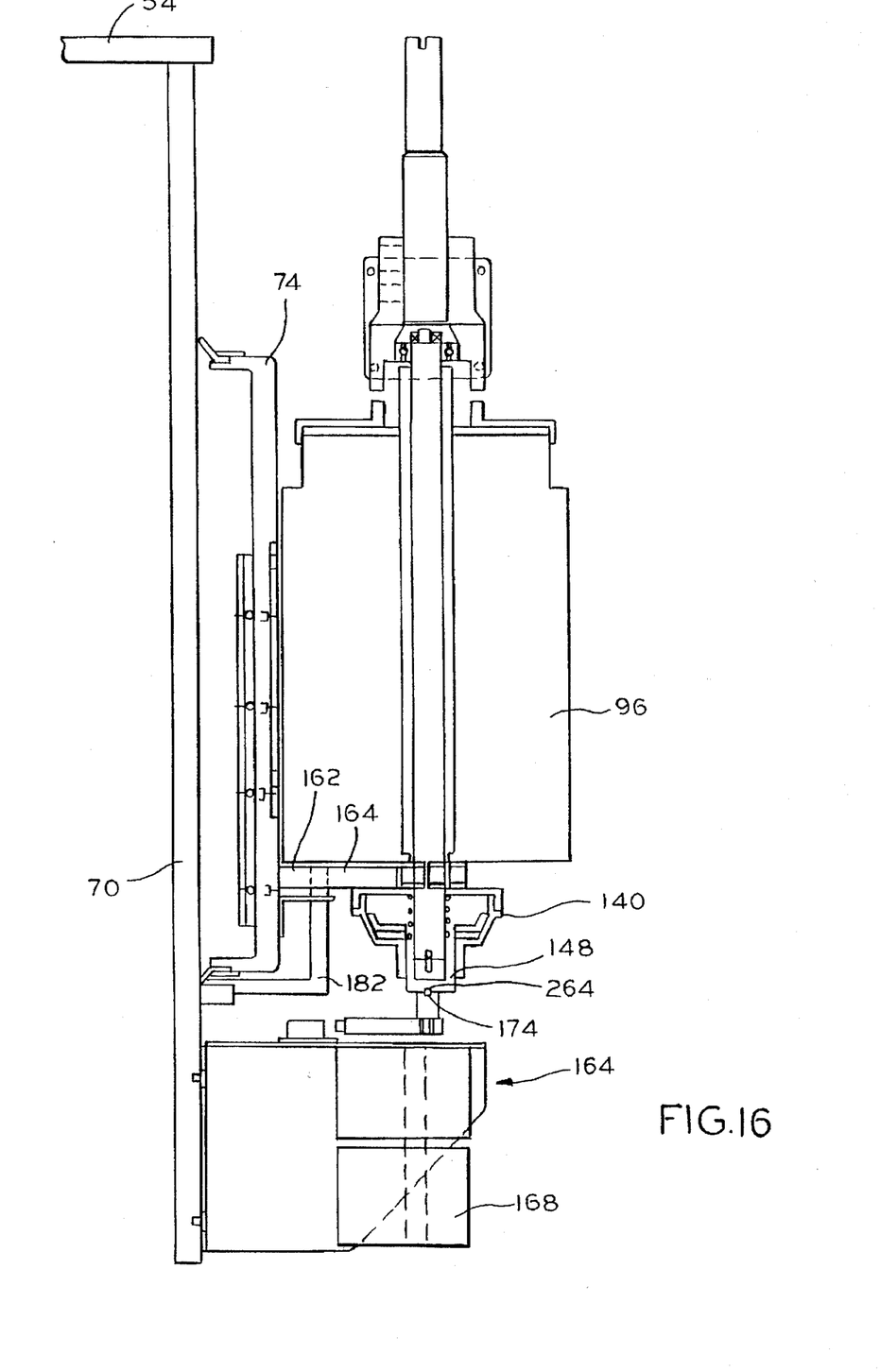
FIG. 16 is a view similar to that of FIG. 3 showing the drilling apparatus in a position for varying offset of the boring head.

Also mounted to the plate 70 above the bracket 166 are a sensing switch 180 for sensing when the carriage 74 is in a home position. Also connected to the plate 70 is a mechanical catch 182 which is positioned to act as a mechanical stop for the motor shaft alignment lever 160 when the carriage 74 is in the home position, as shown in FIG. 16.

Figure 17:
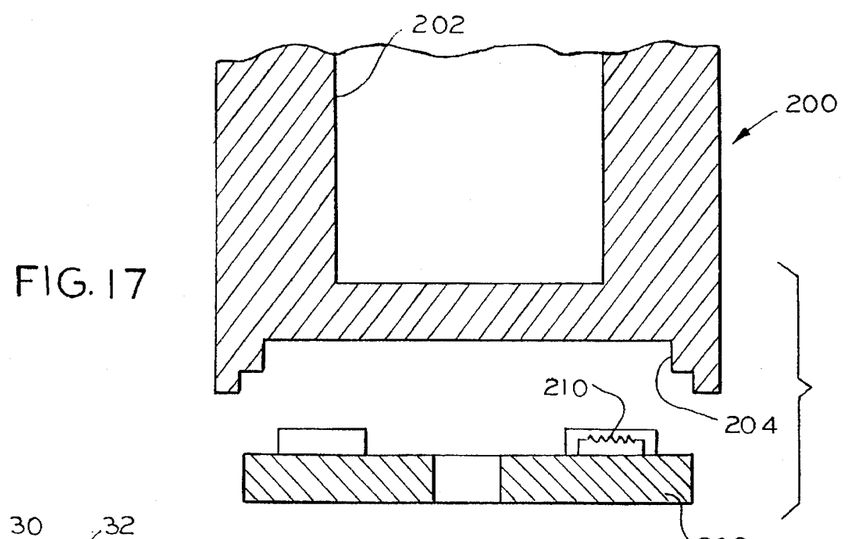
FIG. 17 is a partial sectional, exploded view of a finger insert for a bowling ball.
Figure 18:
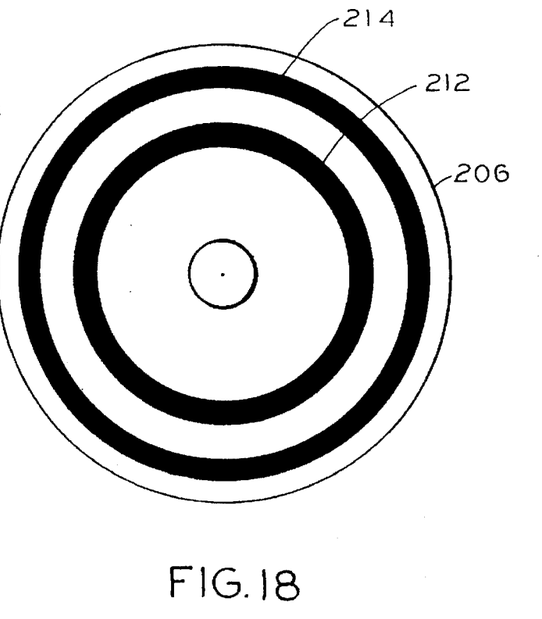
FIG. 18 is a bottom plan view of the insert of FIG. 17.
Figure 19:
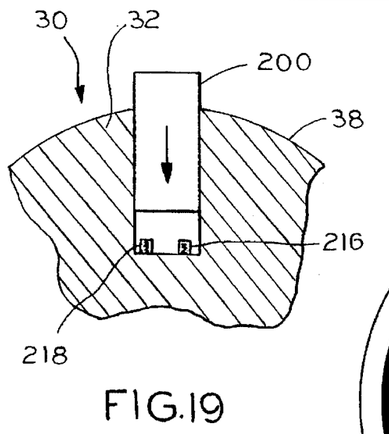
FIG. 19 is a partial elevation view showing installation of the insert of FIG. 17 in the fitting apparatus of FIG. 1.

As discussed above, during a fitting operation, the user selects an insert 200, see FIG. 17, from a plurality of such inserts. Each insert 200 is generally cylindrical and includes a counterbore 202 of a size corresponding to an appropriate finger hole size for a user. For each bowling ball to be drilled three such inserts are used, one for each finger, and are placed in the openings 34, 36 and 38, see FIG. 1. The bottom of each insert 200 includes a cavity 204 configured to receive a circuit board 206. The circuit board 206 includes circuitry represented by a resistive element 210. The particular resistance is selected to correspond to the diameter of the finger opening 202. Referring to FIG. 18, an underside of the circuit board 206 is illustrated and is shown to include plated, conductive, concentric tracks 212 and 214 connected to the circuit represented by the resistive element 210. Gold plating may be used to reduce opportunities for corrosion. When the insert 200 is inserted in one of the finger openings, such as the finger opening 38, see FIG. 19, the conductive tracks 212 and 214 will come into contact with springloaded contacts 216 and 218, respectively, at the bottom of the opening 38. As such, the resistance between the terminals 216 and 218 represents the size of the finger hole opening 202. This information can then be communicated via the circuitry in the fitting apparatus 30, discussed in detail in our pending parent application incorporated by reference herein, via the cord 40 to the drilling apparatus 46.

Figure 20:
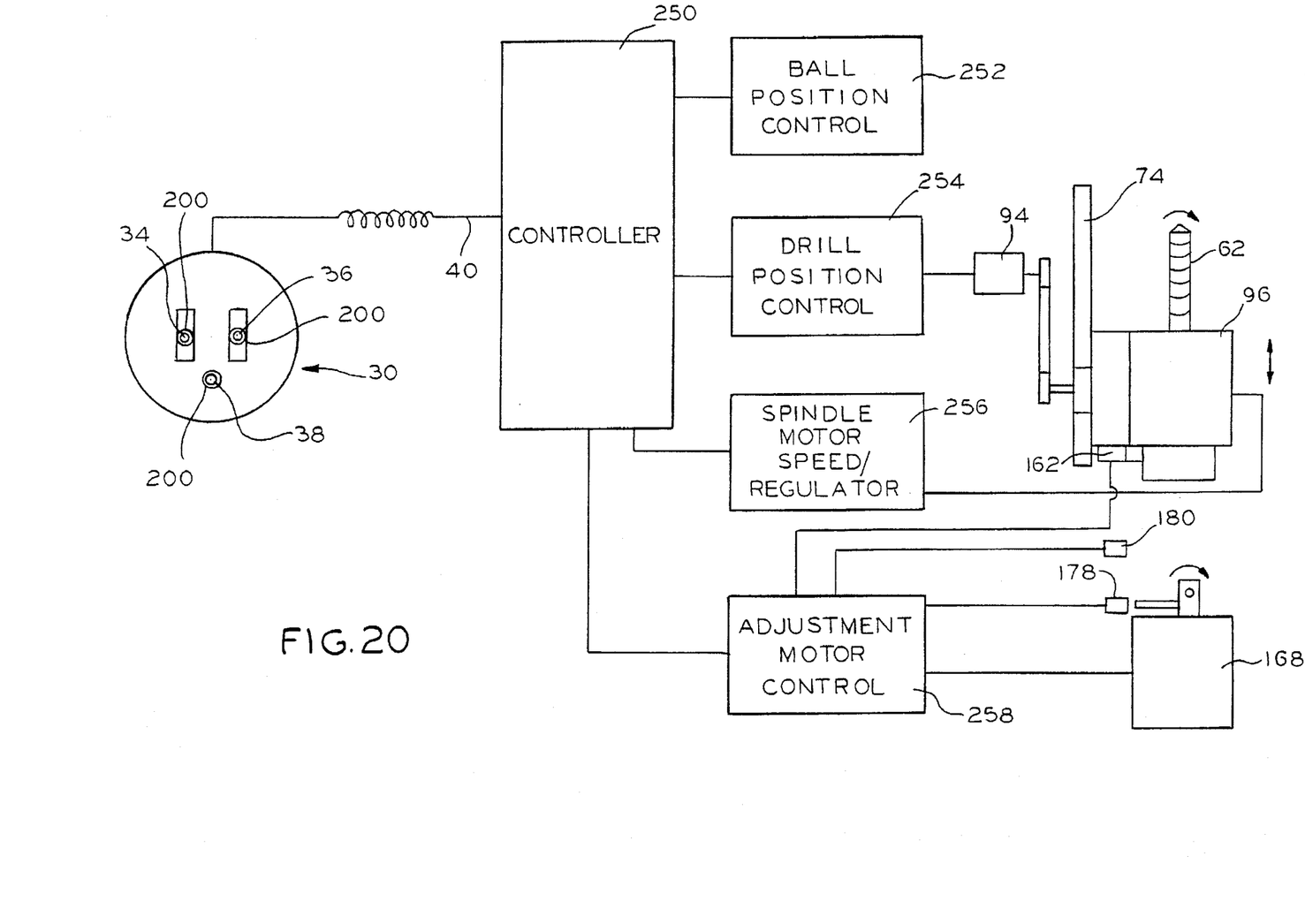
FIG. 20 is a block diagram for an electrical control of the apparatus of FIG. 1.

Referring now to FIG. 20, a block diagram of the control for the drilling apparatus 46 is illustrated. The fitting apparatus is shown at 30 with its connecting cord 40 connected to a controller 250. The controller 250 may comprise any conventional microcontroller or microprocessor-based system operating in accordance with a stored program for controlling a drilling operation. One such a controller is described particularly in our pending application incorporated by reference herein and uses a general control program for controlling basic drilling operations. Reference may be had to such application for generalized operation for controlling the ball gripping apparatus 64 and the like and basic drilling operation. The present application particularly describes the components of the control related directly to the operation for drilling variable size holes in the bowling ball.

The controller 250 is connected to a ball position control 252 which controls the ball gripping apparatus 64, as described above. The controller 250 is also connected to a drill position control 254 which drives the stepper motor 94. Thus, the drill position control is operated, as described in our pending application, to control vertical position of the carriage 74, and thus drill bit 62, during a drilling operation. The spindle motor 96 is controlled by a spindle motor speed/regulator 256, also discussed in greater detail in our pending application. Finally, the controller 250 is connected to an adjustment motor control 258. The adjustment motor control is electrically connected to the adjustment motor 168, the feed table sensing switch 180, the roller switch 178 and the spindle shaft index sensor 162. The adjustment motor control 258 is principally an interface for interfacing signals from the various sensors to the controller 250 and receiving drive signals from the controller 250 for controlling operation of the adjustment motor 168, as is apparent.

Once a drilling operation is commenced as by a user depressing a "start" button 48, appropriate data is transmitted from the fitting apparatus 30 to the drilling apparatus 46. This in the form of a serially transmitted data frame. The data frame includes an ID, followed by representative information for the right span, the left span, the diameter of the thumb hole, the diameter of the right finger hole and the diameter of the left finger hole. Each of the above units is represented in 1/32 inch units in the preferred embodiment.

Subsequently, the ball is appropriately positioned by the ball position control, the details of which are not discussed herein. It is assumed for purposes of this application that a bowling ball B to be drilled is in an appropriate position for drilling each of the three holes when required. The portion of the control operation relative to varying hole size is described in detail herein.

Figure 21:
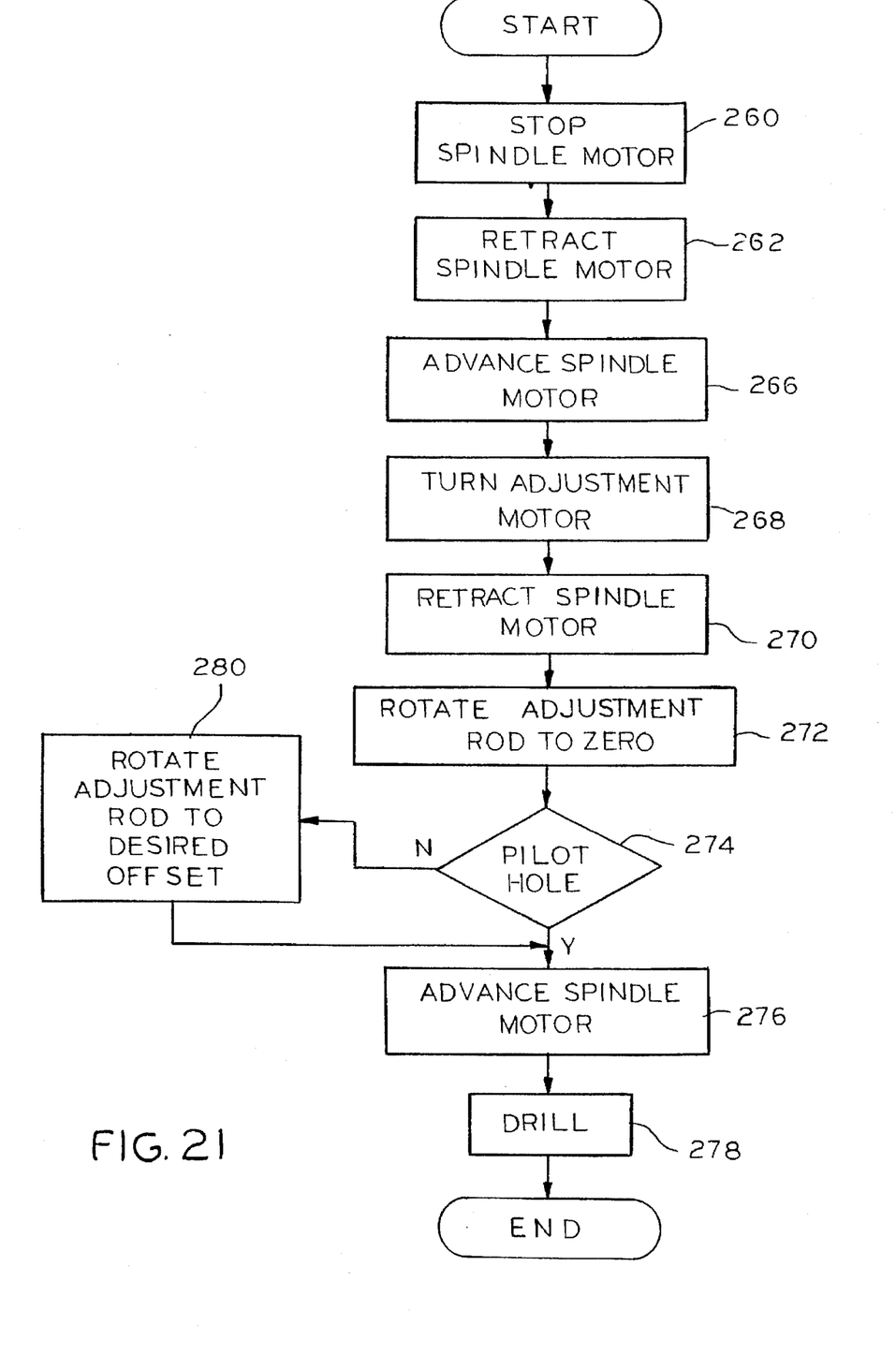
FIG. 21 is a flow diagram illustrating an adjustment routine performed by the control of FIG. 20.

Referring now to FIG. 21, a flow diagram illustrates operation of a program performed in the controller 250 for adjusting hole size. The routine assumes that the spindle motor 96 is in a drilling position with the clutch 140 engaged. Such a position is generally illustrated in FIG. 3. The routine begins by proceeding to a block 260 which turns off power to the spindle motor 96 so that the drill bit 62 is not rotating. The spindle motor is retracted at a block 262 as by driving the stepping motor 94 until the carriage 74 actuates the feed axis sensing switch 180 with the spindle motor 96 in a home position shown in FIG. 16. In so doing, the adjustment motor shaft 72, and particularly the engagement pin 174, engages the clutch inner member 148 to disengage the same. However, prior to performing an adjustment it is necessary that the various rotational components be placed in known reference positions. To do so, the pin 174 must be received in an engagement slot 264 in the inner clutch member 148. To accomplish this, the spindle motor 96 is advanced at a block 266 by moving the carriage 74 upwardly via operation of the stepper motor 94 a known distance such that the inner clutch member 148 just engages the outer clutch member 146. The diameter adjustment motor 168 is then rotated at least one full turn at a block 268 so that the adjustment motor engagement pin 174 drops into the clutch engagement slot 264. The rotation of the adjustment motor then continues until the spindle shaft alignment lever 164 is proximate its proximity sensor 162. At this time, the mechanical catch 182 prevents further spindle rotation beyond that point so that the motor output shaft 98 remains at a known position. The spindle motor 96 is then further retracted at a block 270 to disengage the adjustment clutch 140. Thereafter, the adjustment motor 168 is operated at a block 272 to rotate the adjustment rod until the motor shaft position indicator lever 176 actuates the index switch 178. At this index position, the adjustment rod 130 positions the chuck 110 to its minimum position, shown in FIG. 12, which is appropriate for drilling a pilot hole. A decision block 274 then determines if the hole being drilled is the first hole, i.e., the pilot hole. If so, then the spindle motor 96 is advanced at a block 276 to clear the adjustment engagement pins and so that the mechanical lever 182 no longer prevents further spindle rotation. Thereafter, the spindle motor 96 can be restarted and a drilling operation commenced at a block 278. The particular steps of the drilling operation are described in our pending application incorporated by reference herein.

We now return to the decision block 274. If the hole size commanded is larger than the pilot hole, and the pilot hole has been already drilled, then control proceeds to a block 280 which advances the adjustment motor 168 a known distance. This distance is determined via a look-up table in the controller 250 based on a mathematical sine function representing relationship between rotation of the adjustment rod 130 and an amount of linear offset for the chuck 110. Once the adjustment motor 168 is rotated in an open loop manner to the desired position, then control proceeds to the block 276 to perform a drilling operation.

As described, the adjustable boring head 100 operates via the chuck sliding to produce an offset from the base 108 via a dovetail joint. The cam 132 slides in the slot 124 perpendicular to the dovetail tenon 122, and throughout rotation of the cam 132 the chuck 110 is limited to moving back and forth in the dovetail slot 120. A similar adjustment mechanism could be provide using a rod terminating in a worm gear which drives a rack and pinion arrangement to offset the chuck for various diameters. Alternatively, a motor could be mounted in the spindle shaft to eliminate the clutch and other described components.

As described, the controller 250 can drive the diameter adjustment motor 168 in very small precise increments of motion. In a preferred embodiment of the invention a step motor with a 36:1 gear head is used to provide such precise movement.

Although the apparatus 46 is shown to move the motor 94 in a vertical path and to rotate its shaft 98 about a vertical axis, the path and axis could be in any orientation as necessary for a particular application. The relative orientation of related components would then, as expected, be unchanged.

Thus, the invention broadly comprehends the provision in a ball drilling apparatus for drilling holes of a select variable size. In a preferred embodiment, the operation comprises a two-step operation consisting first of drilling a pilot hole and then orbiting the bit to in effect shave off the sides of the pilot hole to increase the diameter of the hole. As is apparent, more than two passes may be desired, dependent on the size of the pilot hole relative to the desired hole size.

We claim:

1. Apparatus for drilling holes of a select variable size in a bowling ball comprising:

a table having an upwardly opening ball supporting pocket for supporting a ball in a select position;

a boring apparatus mounted proximate the table for reciprocation in a generally vertical path intersecting a supported ball;

means for moving said boring apparatus in said path;

said boring apparatus having an output shaft rotational about a fixed axis;

a boring tool;

an adjustable boring head connected to the output shaft for rotation therewith, the boring head receiving the boring tool and being variably adjusted to offset the boring tool relative to the fixed axis so that the boring tool orbits about the fixed axis to produce a variable size hole in the bowling ball dependent on an amount of the offset; and means for automatically adjusting the offset as part of a drilling operation.

2. The apparatus of claim 1 wherein said boring head comprises a base fixedly connected to said shaft and including a slot generally perpendicular to the fixed axis and a drill chuck having a tail slidably received in the slot to produce the offset.

3. The apparatus of claim 2 wherein said slot comprises a dovetail slot and said tail comprises a dovetail received in said dovetail slot.

4. The apparatus of claim 2 further comprising means for selectively controlling the amount of the offset.

5. Apparatus for drilling holes of a preselect variable size in a bowling ball comprising:

means for supporting a ball in a select position;

a boring apparatus mounted proximate the supporting means for reciprocation in a path intersecting a supported ball;

means for moving said boring apparatus in said path;

said boring apparatus having an output shaft rotational about a fixed axis, wherein said output shaft comprises a hollow shaft receiving an adjustment rod, the adjustment rod including an offset cam operatively engaging the drill chuck whereby rotation of the adjustment rod relative to the output shaft slidably moves the chuck relative to the base to produce the offset;

a boring tool;

an adjustable boring head connected to the output shaft for rotation therewith, said boring head comprising a base fixedly connected to said shaft and including a slot generally perpendicular to the fixed axis and a drill chuck having a tail slidably received in the slot to produce the offset, said boring head receiving the boring tool and being variably adjusted to offset the boring tool relative to the fixed axis so that the boring tool orbits about the fixed axis to produce a variable size hole in the bowling ball dependent on an amount of the offset; and means for selectively controlling the amount of the offset.

6. The apparatus of claim 5 further comprising a clutch locking the adjustment rod and the output shaft together.

7. The apparatus of claim 6 further comprising an adjustment mechanism operable to selectively disengage the clutch and rotate the adjustment rod relative to the output shaft.

8. The apparatus of claim 7 comprising an adjustment motor including a motor shaft and movement of the boring apparatus proximate the adjustment motor causes the adjustment motor to engage the clutch to disengage the clutch so that rotation of the motor shaft rotates the adjustment rod relative to the output shaft.

9. The apparatus of claim 8 further comprising a mechanical catch for preventing rotation of the output shaft incident to operation of the adjustment motor.

10. Apparatus for drilling holes of a select variable size in a bowling ball comprising:

means for supporting a ball in a select position;

a boring apparatus mounted proximate the supporting means for reciprocation in a path intersecting a supported ball;

means for moving said boring apparatus in said path;

said boring apparatus having an output shaft rotational about a fixed axis;

a boring tool;

an adjustable boring head connected to the output shaft for rotation therewith, the boring head receiving the boring tool and being variably adjusted to offset the boring tool relative to the fixed axis so that the boring tool orbits about the fixed axis to produce a variable size hole in the bowling ball dependent on an amount of the offset;

means for selecting a desired hole diameter; and a boring head control operable to drill the desired hole size and operable to initially position the boring head to produce a zero offset to drill a pilot hole and subsequently position the boring head to produce a select offset required to drill a hole of the desired hole diameter.

11. The apparatus of claim 10 wherein said boring head comprises a base fixedly connected to said shaft and including a slot generally perpendicular to the fixed axis and a drill chuck having a tail slidably received in the slot to produce the offset.

12. The apparatus of claim 10 further comprising means for automatically adjusting the offset as part of a drilling operation.

13. The apparatus of claim 11 wherein said slot comprises a dovetail slot and said tail comprises a dovetail received in said dovetail slot.

14. The apparatus of claim 11 further comprising means for selectively controlling the amount of the offset.

15. The apparatus of claim 14 wherein said output shaft comprises a hollow shaft receiving an adjustment rod, the adjustment rod including an offset cam operatively engaging the drill chuck whereby rotation of the adjustment rod relative to the output shaft slidably moves the chuck relative to the base to produce the offset.

16. The apparatus of claim 15 further comprising a clutch locking the adjustment rod and the output shaft together.

17. The apparatus of claim 16 further comprising an adjustment mechanism operable to selectively disengage the clutch and rotate the adjustment rod relative to the output shaft.

18. The apparatus of claim 17 comprising an adjustment motor including a motor shaft and movement of the boring apparatus proximate the adjustment motor causes the adjustment motor to engage the clutch to disengage the clutch so that rotation of the motor shaft rotates the adjustment rod relative to the output shaft.

19. The apparatus of claim 18 further comprising a mechanical catch for preventing rotation of the output shaft incident to operation of the adjustment motor.

* * * * *